INVENTOR
EDWIN F. BURNER

2,977,070
AUTOMATIC FLIGHT CONTROL SYSTEM

Edwin F. Burner, Falls Church, Va., assignor to the United States of America as represented by the Secretary of the Navy Filed Apr. 30, 1959, Ser. No. 810,194

4 Claims. (Cl. 244—77)

(Granted under Title 35, U.S. Code (1952), sec. 266)

The invention described herein may be manufactured and used by or for the Government of the United States of America for governmental purposes without the payment of any royalties thereon or therefor.

The present invention relates to automatic flight control systems and more particularly to automatic flight control systems wherein inertial reference control loops are added which will permit maintaining an aircraft on a predescribed flight path and at a predetermined speed with greater accuracy than previously possible.

Present autopilots utilize either barometric pressure altitude reference, or a radar altimeter reference. Present autopilots have no lateral distance reference. They stabilize on an angular reference such as a directional gyro (slaved to a compass, or free). Speed is controlled by either airspeed indicators which may be corrected to true airspeed or it may be referenced to a longitudinal accelerometer. The existing systems, that use the air mass as a reference are not accurate enough for precision bombing and accordingly:

An object of the present invention is the provision of an improved aircraft flight control system for accurately controlling the flight path and speed of an aircraft relative to ground.

Other objects and many of the attendant advantages of this invention will be readily appreciated as the same becomes better understood by reference to the following detailed description when considered in connection with the accompanying drawings wherein.

Figure 1:
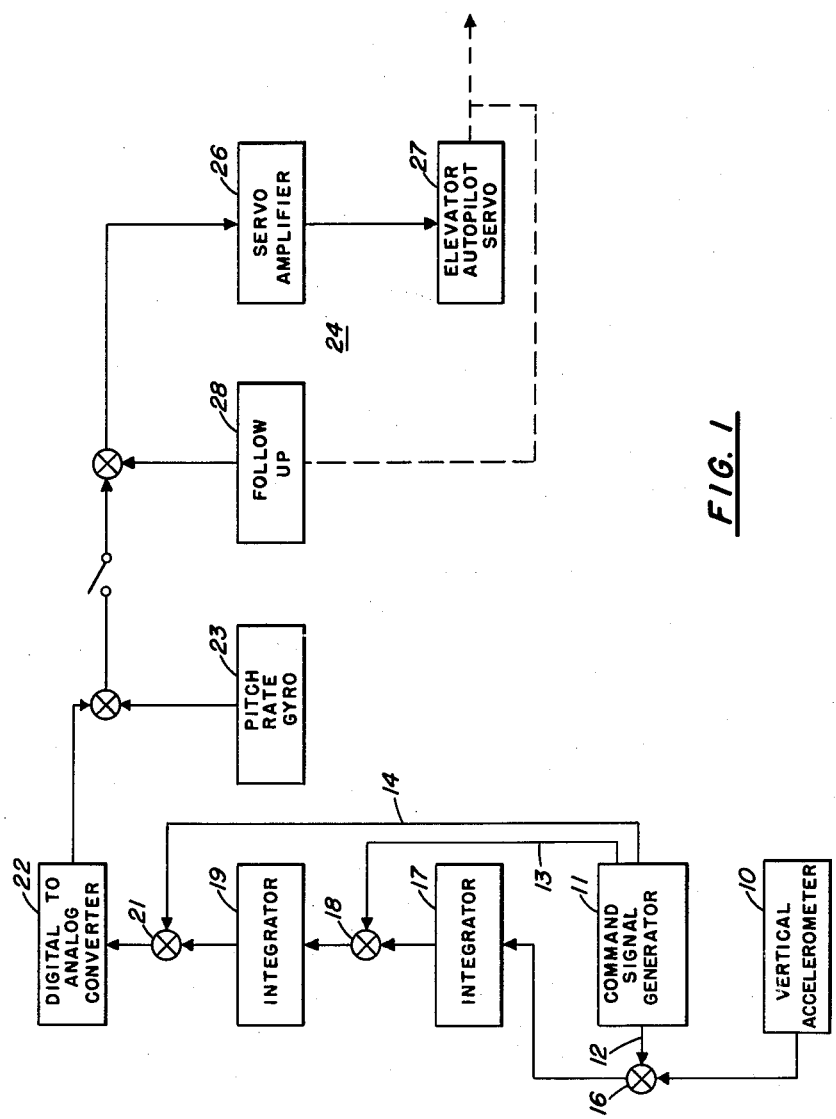
Fig. 1 is an autopilot elevator channel embodying the invention.

Referring now to the drawings, there is shown in Fig. 1 a vertical accelerometer 10 which may be mounted on a stable platform (not shown). The output of accelerometer 10 is vertical acceleration. A command signal generator 11 provides three output signals, vertical acceleration 12, vertical velocity 13 and altitude 14, for trimming or altering the flight path.

These signals can be pilot inputs or signals sent to the aircraft from an external guidance system. The command signal generator consists of a digital shaft encoder for each command signal required, the shaft position on the encoder being the selection made by the pilot. The command acceleration signal 12 is compared with the output signal of accelerometer 10 in comparator 16, which produces a vertical acceleration error signal. This error signal is integrated by integrator 17, to produce a signal proportional to velocity. This velocity signal is compared with the command velocity signal 13 in comparator 18 to produce a vertical velocity error signal. The velocity error signal is integrated in integrator 19 to generate a signal proportional to altitude error. This altitude error signal is compared with the command altitude signal 14 in comparator 21 to generate a signal proportional to the error distance from the commanded altitude. Due to the desired accuracies, integrators 17 and 19 are of the digital type, although analog integrators may be used. The digital output signal of comparator 21 is converted to an analog output signal by converter 22 and combined with the output of pitch rate gyro 23 to provide an input command signal to the elevator autopilot servo loop 24. Servo loop 24 comprises a servo amplifier 26, elevator servo 27, and follow up 28.

Figure 2:
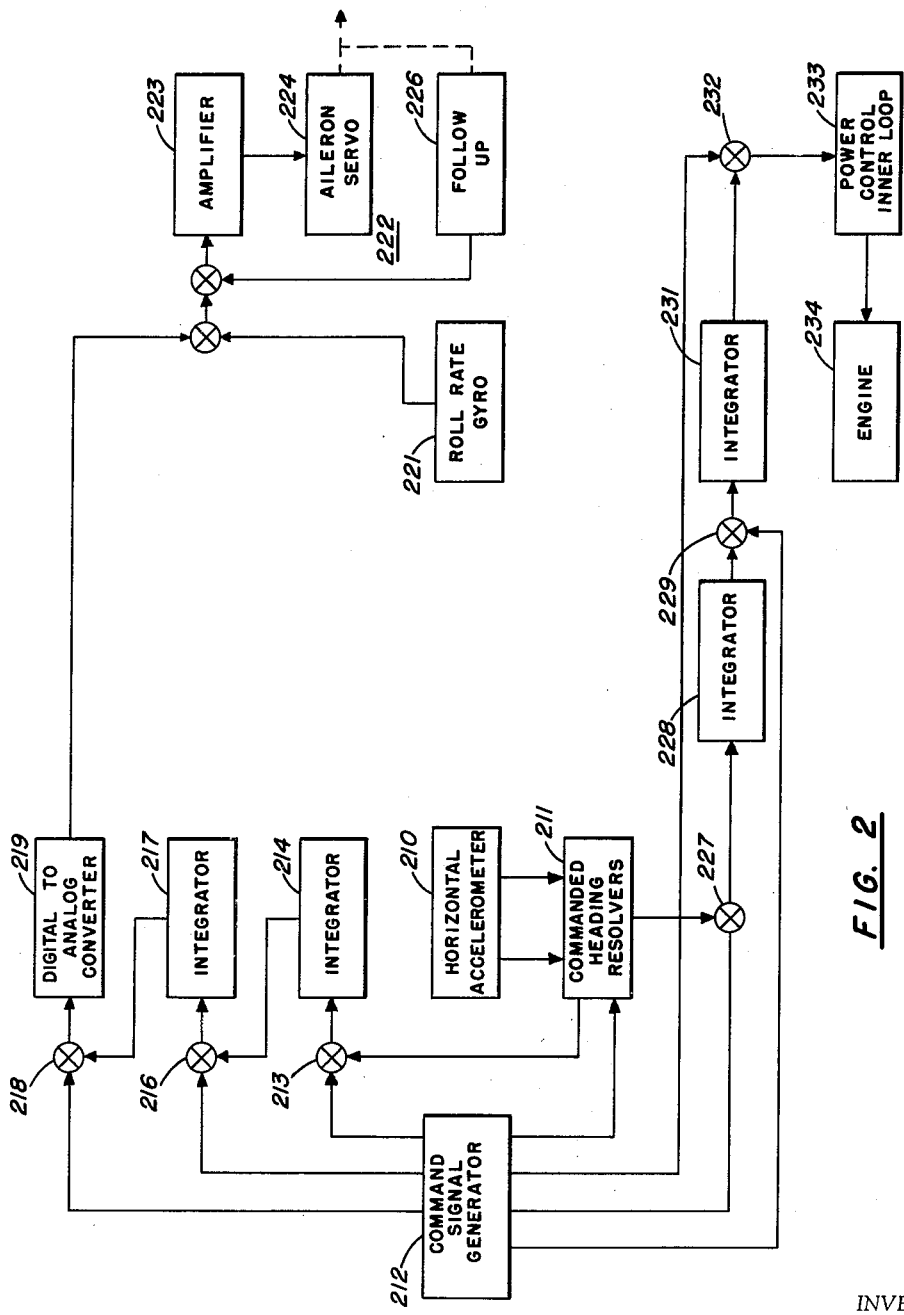
Fig. 2 is an autopilot aileron channel and speed control channel embodying the invention.

Referring now to Fig. 2 there is shown a horizontal accelerometer 210 mounted on a stable platform (not shown) aligned to the earth's coordinates. Resolver 211 is provided to resolve the outputs of accelerometer 210 which are in earth coordinates into coordinates of the commanded flight path. The commanded flight path signals are provided by command signal generator 212. Resolver 211 resolves the horizontal accelerometer output into lateral and longitudinal acceleration signals respectively. The lateral acceleration signal is used in the aileron control loop and the longitudinal acceleration signal is used in the speed control loop in a similar manner as the vertical acceleration is used in the elevator loop. Lateral acceleration from resolver 211 is compared with command acceleration signal from command signal generator 212 in comparator 213 to produce a lateral acceleration error signal. This error signal is integated in integrator 214 to obtain lateral velocity signal. The lateral velocity signal is compared in comparator 216 with the commanded lateral velocity signal to produce a lateral velocity error signal. The lateral velocity error signal is integrated in integrator 217 to obtain a lateral displacement signal. The lateral displacement signal is compared with the commanded lateral displacement signal in comparator 218 to obtain a lateral displacement error signal. The digital output of comparator 218 is converted to an analog signal by digital to analog converter 219. The digital to analog conversion is made for convenience since inaccuracies in the servo loop do not affect the overall system accuracy. This analog signal is added to the output signal of roll rate gyro 221 to produce an input signal to aileron control loop 222 which comprises amplifier 223, aileron servo 224 and follow up circuit 226.

The longitudinal acceleration signal from accelerometer 211 is compared with the longitudinal acceleration command signal in comparator 227. And the resulting longitudinal acceleration error signal is integrated by integrator 228 to obtain a speed signal. This speed signal is compared with the commanded speed signal in comparator 229 to obtain a speed error signal. This speed error signal is integrated in integrator 231 to obtain a pacing, distance signal. The pacing distance signal is compared in comparator 232 with the pacing distance commanded signal to obtain a pacing distance error signal. The pacing distance error signal is the input to power control loop 233 which controls the speed of engine 234.

The operation of the system may be explained as follows: Assume two aircraft are flying in a three plane formation with a towed target which is flying at constant ground speed. One aircraft has the conventional control system and the other aircraft has the system herein described. Suppose a sudden gust of wind slows down both aircraft (but not the target). The first aircraft will regain his lost speed, but will have dropped back out of formation. The second aircraft will automatically speed up and regain its place in formation before resuming the pacing speed. The second aircraft has thus erased the effect of the gust completely and is accurately located where it should be relative to the ground.

Obviously many modifications and variations of the present invention are possible in the light of the above teachings. It is therefore to be understood that within the scope of the appended claims the invention may be practiced otherwise than as specifically described.

What is claimed is:

1. In an aircraft navigation system, the combination comprising means for providing an acceleration signal, velocity signal and displacement signal to command said aircraft to fly in a predetermined path, means for providing a signal proportional to the acceleration of said aircraft, means for comparing said commanded acceleration signal and said actual acceleration signl to produce an acceleration error signal, first integrator means for integrating said acceleration error signal to provide a signal proportional to velocity, means for comparing said velocity signal and said commanded velocity signal to provide a velocity error signal, second integrating means for integrating said velocity error signal to provide a signal proportional to displacement, means for comparing said displacement signal and said commanded displacement signal to provide a displacement error signal, and means responsive to said displacement error signal to control the flight of said aircraft to reduce said error signals to zero.

2. In an aircraft navigation system, the combination comprising means for providing a vertical acceleration signal, a vertical velocity signal and a vertical displacement signal to command said aircraft to fly in a predetermined path; means for providing a signal proportional to the vertical acceleration of said aircraft, means for comparing said commanded vertical acceleration and said actual vertical acceleration signals to produce a vertical acceleration error signal, first integrator means for integrating said vertical acceleration error signal to provide a signal proportional to vertical velocity, means for comparing said vertical velocity signal and said commanded vertical velocity signal to provide a vertical velocity error signal, second integrating means for integrating said vertical velocity error signal to provide a signal proportional to vertical displacement, means for comparing said vertical displacement signal and said commanded vertical displacement to provide a vertical displacement error signal, and means responsive to said vertical displacement error signal to control the flight of said aircraft to reduce said error signals to zero.

3. In an aircraft navigation system, the combination comprising means for providing lateral acceleration, lateral velocity and lateral displacement signals to command said aircraft to fly in a predetermined path, means for providing a signal proportional to the actual lateral acceleration of said aircraft, means for comparing said commanded lateral acceleration signal with said actual lateral acceleration signal to produce a lateral acceleration error signal, first integrator means for integrating said lateral acceleration error signal to provide a signal proportional to lateral velocity, means for comparing said lateral velocity signal and said commanded lateral velocity signal to provide a lateral velocity error signal, second integrating means for integrating said lateral velocity error signal to provide a signal proportional to lateral displacement, means for comparing said lateral displacement signal and said commanded lateral displacement signal to provide a lateral displacement error signal and means responsive to said lateral displacement error signal to control the flight of said aircraft to reduce said error signals to zero.

4. In an aircraft navigation system, the combination comprising means for providing longitudinal acceleration, speed and pacing distance signals to command said aircraft to maintain a predetermined pacing distance, means for providing a signal proportional to the actual longitudinal acceleration of said aircraft, means for comparing said actual longitudinal acceleration signal and said commanded longitudinal acceleration signal to produce a longitudinal acceleration error signal, first integrator means for integrating said longitudinal acceleration error signal to provide a speed signal, means for comparing said speed signal and said commanded speed signal to provide a speed error signal, second integrator means for integrating said speed error signal to provide a pacing distance signal, means for comparing said pacing distance signal and said commanded pacing distance signal to provide a pacing distance error signal, and means responsive to said pacing distance error to control the speed of said aircraft to reduce said error signals to zero.

References Cited in the file of this patent

UNITED STATES PATENTS 2,808,999    Chenery _____ Oct. 8, 1957